United States Patent
Barezzani et al.

(10) Patent No.: US 10,160,043 B2
(45) Date of Patent: Dec. 25, 2018

(54) DEVICE FOR COUPLING AND CENTERING TOOLS

(71) Applicant: Cembre S.p.A., Brescia (IT)

(72) Inventors: Gualtiero Barezzani, Brescia (IT); Michele Orizio, Brescia (IT)

(73) Assignee: Cembre S.p.A., Brescia (IT)

(*) Notice: Subject to any disclaimer, the term of this patent is extended or adjusted under 35 U.S.C. 154(b) by 0 days.

(21) Appl. No.: 15/436,373

(22) Filed: Feb. 17, 2017

(65) Prior Publication Data

US 2017/0246694 A1   Aug. 31, 2017

(30) Foreign Application Priority Data

Feb. 25, 2016   (IT) .................. 102016000019650

(51) Int. Cl.
*B23B 31/107* (2006.01)
*B23B 31/113* (2006.01)
(Continued)

(52) U.S. Cl.
CPC .......... *B23B 31/1075* (2013.01); *B23B 31/02* (2013.01); *B23B 31/113* (2013.01); *B23B 31/1074* (2013.01); *B23B 2231/24* (2013.01); *B23B 2250/12* (2013.01); *B23B 2260/126* (2013.01); *F16D 1/0847* (2013.01); *F16D 1/0894* (2013.01)

(58) Field of Classification Search
CPC ............ B23B 31/1075; B23B 31/1074; B23B 2231/365; B23B 2215/32; B23B 2260/126; B23B 31/113; Y10T 279/17008; Y10T 279/17821; Y10T 279/17923; Y10T 279/17846; Y10T 279/29; Y10T 279/3443; Y10T 279/17863
See application file for complete search history.

(56) References Cited

U.S. PATENT DOCUMENTS 1,510,282 A * 9/1924 Johnson ................ E21B 17/046
                                                        279/83
1,782,272 A * 11/1930 Power ..................... B23B 23/04
                                                        82/150
(Continued)

FOREIGN PATENT DOCUMENTS

DE        75 13 937 U      9/1975
DE    202013104099 U1 *  11/2013
(Continued)

OTHER PUBLICATIONS

Machine translation, Japan patent document, JP S53-139683, Komori, H., Nov. 1978.*

*Primary Examiner* — Eric A Gates
*Assistant Examiner* — Chwen-Wei Su
(74) *Attorney, Agent, or Firm* — Blank Rome LLP

(57) ABSTRACT

A device for coupling and centering tools has a tubular portion with a coupling seat laterally delimited by a cylindrical centering surface, a first threaded hole with a first tightening dowel projecting into the coupling seat, a second threaded hole with a second tightening end projecting into the coupling seat, a third hole tangential to the centering surface and a locking pin removably lockable in the third hole in a position interfering with the coupling seat, and removable from the third hole to free the coupling seat.

13 Claims, 5 Drawing Sheets

(51) Int. Cl.
  *B23B 31/02* (2006.01)
  *F16D 1/08* (2006.01)

(56) References Cited

U.S. PATENT DOCUMENTS

| | | | |
|---|---|---|---|
| 2,283,514 A * | 5/1942 | Stanworth | B23B 31/1075 279/83 |
| 2,320,397 A * | 6/1943 | Ross | B60D 1/62 220/315 |
| 3,664,677 A * | 5/1972 | Sunderman et al. | B23B 31/028 279/105.1 |
| 3,726,533 A * | 4/1973 | Lafferty, Sr. | B23B 31/1074 279/97 |
| 4,630,980 A | 12/1986 | Kubo | |
| 4,954,026 A * | 9/1990 | Zurwelle | B23B 45/006 206/373 |
| 5,542,792 A * | 8/1996 | Krueger | B23B 31/1074 407/35 |
| 5,876,158 A * | 3/1999 | Beiter | B23B 31/008 192/55.1 |
| 5,957,615 A | 9/1999 | Orain | |
| 6,702,530 B2 * | 3/2004 | Bennage | B23B 45/006 408/241 R |
| 2006/0013665 A1 | 1/2006 | Perry et al. | |
| 2016/0016235 A1* | 1/2016 | Chen | B23B 31/11 279/20 |

FOREIGN PATENT DOCUMENTS

| | | | | |
|---|---|---|---|---|
| EP | 1306151 A1 * | 5/2003 | | B23B 29/03428 |
| GB | 1 450 983 A | 9/1976 | | |
| JP | 53-139683 U | 11/1978 | | |
| JP | 58-128807 U | 8/1983 | | |

* cited by examiner

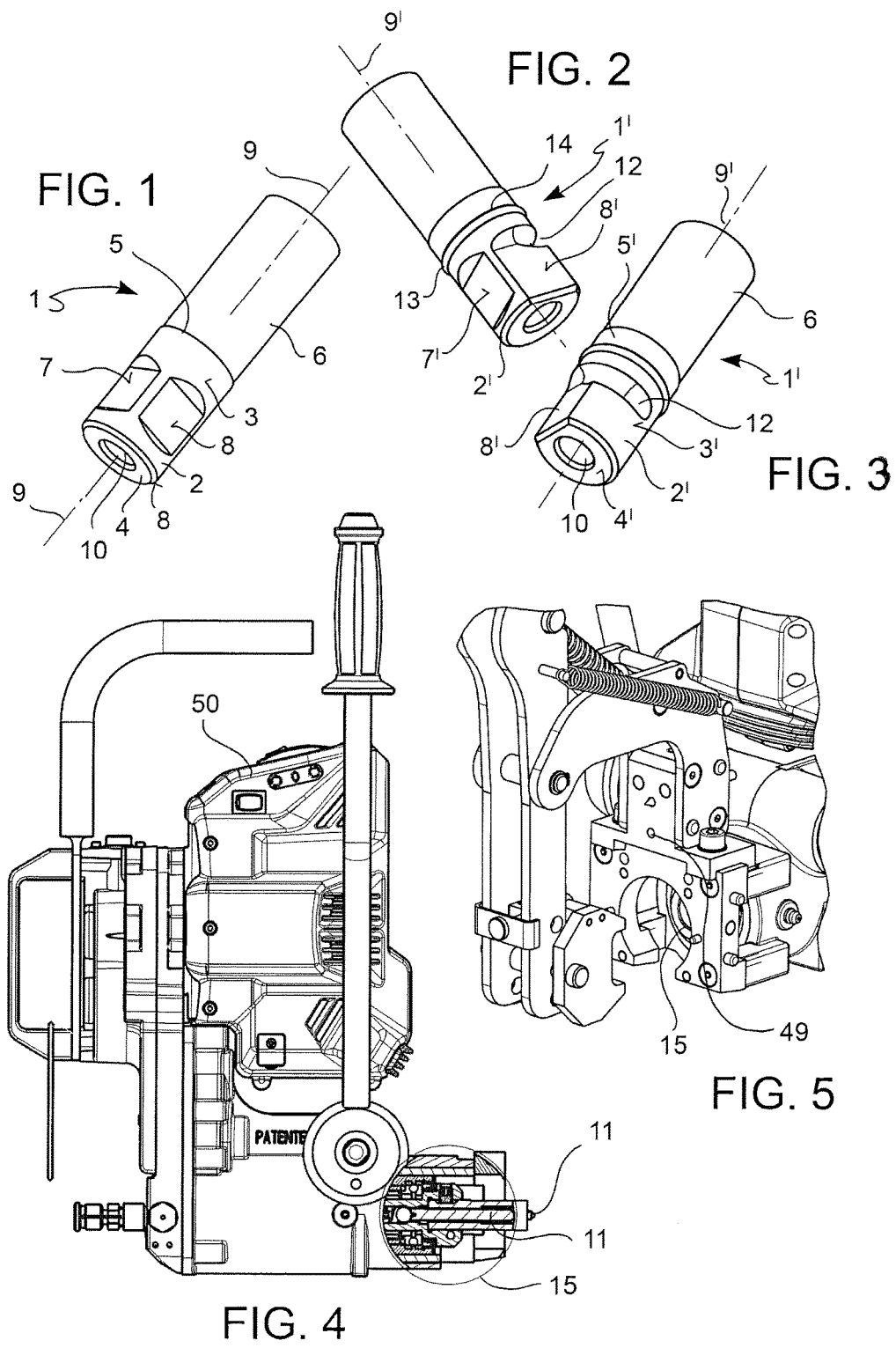

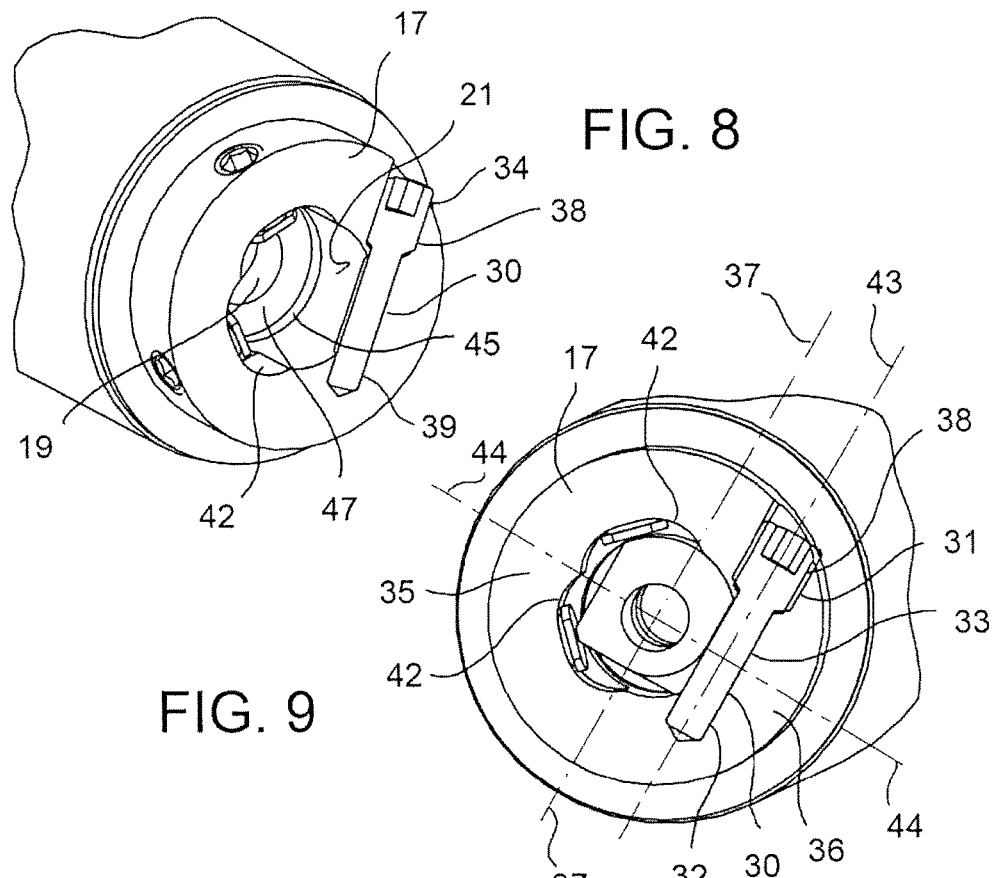
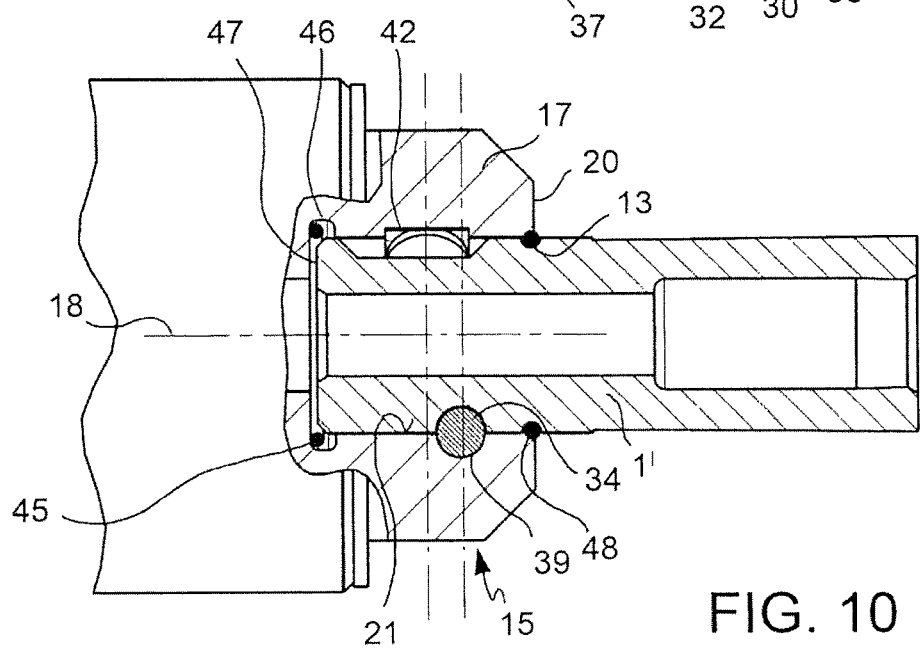

DEVICE FOR COUPLING AND CENTERING TOOLS

BACKGROUND OF THE INVENTION

1. Field of the Invention

The present invention relates to a device for coupling and centering tools with a spindle, for example in a drill for drilling tracks and apparatuses of the track in railway applications.

2. Description of the Related Art

Rotary machine tools usually comprise a spindle on which it is possible to mount or which can form a device for coupling and centering tools, for example drill bits or milling cutters, in order to be able to carry out a certain type of machining on or through them.

Different systems for coupling milling cutters with the spindle are known, including the "Quick" coupling system commonly used in North America and the so-called "Weldon" coupling system used in Europe.

In the known "Weldon" system, the spindle forms a cylindrical coupling seat with two radial tightening dowels (also called "grub screws") perpendicular to one another and with an annular seal, positioned on the bottom of the coupling seat.

The corresponding tool 1 (FIG. 1), for example a milling cutter, forms a coupling portion 2 able to be inserted in the "Weldon" coupling seat and having a cylindrical outer surface 3 extending from a rear free end 4 of the coupling portion 2 up to a front region thereof 5 from which a work portion 6 of the tool 1 extends. The free end 4 has a beveled radially outer edge that forms an annular sealing surface 8, intended to abut against the annular seal of the "Weldon" coupling seat to prevent leakage of cooling liquid conveyed through the coupling.

In the cylindrical surface 3 two flat locking surfaces 7, 8 are formed locally that are perpendicular to one another and parallel to a longitudinal axis 9 of the tool 1. The locking surfaces 7, 8 are formed in a region spaced from the free end 4 (such as not to interfere with the sealing surface 8) and constitute recesses with respect to the cylindrical surface 3 which determines the maximum radial bulk of the coupling portion 2.

The tool 1 with "Weldon" coupling portion can be locked in the "Weldon" coupling seat through tightening of the two tightening dowels against the locking surfaces 7, 8. The tool 1 of the "Weldon" type also forms a longitudinal hole 10 extending through the entire coupling portion 2 for the passage of the cooling liquid and/or of a centering tip 11.

In the known "Quick" system, the spindle forms a cylindrical coupling seat without annular seal and without radial tightening dowels, but rather with a single tangential pin that interferes with and extends partially through the space delimited by the coupling seat.

The corresponding tool 1' (FIGS. 2, 3), for example a milling cutter, forms a coupling portion 2' with a cylindrical outer surface 3' extending from a rear free end 4' of the coupling portion 2' up to a front region thereof 5' from which a work portion 6 of the tool 1 extends.

In the cylindrical surface 3' two flat locking surfaces 7', 8' are locally formed that are perpendicular to each other and parallel to a longitudinal axis 9' of the tool 1'. The locking surfaces 7', 8' constitute recesses with respect to the cylindrical surface 3 which determines the maximum radial bulk of the coupling portion 2. A first locking surface 7' of the locking surfaces 7', 8' is formed in a region spaced from the free end 4' whereas a second locking surface 8' extends up to the free end 4', making the formation of a sealing surface impossible in this area. In the cylindrical surface 3' a locking throat 12 is also formed, extending from the second locking surface 8' in the circumferential direction on an opposite side with respect to the first circumferential surface 7'. Observing in the work direction (forwards) the locking throat extends in the clockwise direction, in other words in the usual direction of rotation of the spindles of machine tools.

In order to prevent the escape of cooling liquid conveyed through the "Quick" coupling, the coupling portion 2' comprises an annular seal 13, for example an O-ring, received in a circumferential groove 14 formed in the cylindrical surface 3' distanced from the locking surfaces 7', 8' and from the locking throat 12 on an opposite side thereof with respect to the free end 4'.

The coupling portion 2' of the "Quick" type can be inserted in the "Quick" coupling seat with only one orientation in which the tangential pin is adjacent to and aligned with the second locking surface 8' and does not interfere with the cylindrical surface 3'. A subsequent rotation of the coupling portion 2' in the opposite direction to the work rotation direction engages the tangential pin in the locking throat 12 which holds the tool 1'. In the locked position, the annular seal 13 is in abutment against an annular sealing surface of the "Quick" coupling seat.

Thanks to the arrangement of the two locking surfaces 7', 8' and to the annular seal 13, the same "Quick" coupling portion can also be used with the "Weldon" coupling seat, whereas the "Weldon" coupling portion cannot be used with the "Quick" coupling seat.

In niche or highly specialized sectors due to the particular work conditions, for example in the field of laying rail tracks, the machine tools (milling cutters, drills) are sometimes special apparatuses, supplied by a few manufacturers and used around the world, whereas an easy and cost-effective purchase of the tools (e.g. the drill bits or the milling cutter bits) from local manufacturers is still impeded by the different coupling standards.

SUMMARY OF THE INVENTION

The purpose of the present invention is therefore to provide a single device for coupling and centering tools with a spindle, having characteristics such as to receive both "Weldon" type tools and "Quick" type tools, ensuring the locking and centering functionalities as well as that of conveying the cooling liquid in both usage situations.

These and other purposes are achieved through a device for coupling and centering tools with a spindle according to claim 1. The dependent claims concern specific and advantageous embodiments.

According to an aspect of the invention, a device for coupling and centering tools with a spindle comprises a tubular portion having a longitudinal (geometric) axis and forming:

a coupling seat open at a front end of the tubular portion and laterally delimited by a cylindrical centering surface, coaxial to the longitudinal axis, a first threaded hole wherein a first tightening dowel (grub screw) is screwed, having a first tightening end projecting into the coupling seat, a second threaded hole wherein a second tightening dowel (grub screw) is screwed, having a second tightening end projecting into the coupling seat, wherein the first tightening dowel and the second tightening dowel extend along tightening axes transverse to one another and transverse to the longitudinal axis, characterized by:

a third hole substantially tangential to the centering surface and which at least partially intersects the coupling seat, a locking pin removably lockable in the third hole in a position such as to interfere with the coupling seat, and removable from the third hole such as to free the coupling seat, wherein the first threaded hole with the first tightening dowel and the second threaded hole with the second tightening dowel are arranged in a first half of the tubular portion, whereas the third hole is formed in a second half of the tubular portion geometrically separated from the first half by a diametrical plane containing the longitudinal axis.

The coupling device allows both "Weldon" and "Quick" tools to be received with the same modes of use already known by the operators. The adaptation from one configuration to another takes place easily through the insertion and extraction of the locking pin into/from the third hole.

BRIEF DESCRIPTION OF THE DRAWINGS

In order to better understand the invention and appreciate the advantages thereof, the description of non-limiting embodiments thereof will be provided hereinafter, with reference to the attached figures, in which:

FIG. 1 is a perspective view of a tool, e.g. a milling cutter, of the per se known "Weldon" type, but also forming part of a coupling system according to the invention, FIGS. 2 and 3 are perspective views of a tool, e.g. a milling cutter, of the per se known "Quick" type, but also forming part of a coupling system according to the invention, FIG. 4 is a side view, partially in section, and with some parts removed, of a drilling apparatus according to an embodiment of the invention, FIG. 5 is a perspective front-side view of the drilling apparatus in FIG. 4, FIG. 8 is a perspective view in section according to a first section plane of a coupling device according to an embodiment, FIG. 9 is a perspective view in section of the coupling device in FIG. 8 that receives a tool with "Quick" coupling, FIG. 10 is a side section view of the coupling device in FIG. 8 that receives a tool with "Quick" coupling.

DETAILED DESCRIPTION OF THE PREFERRED EMBODIMENTS

Figure 6:
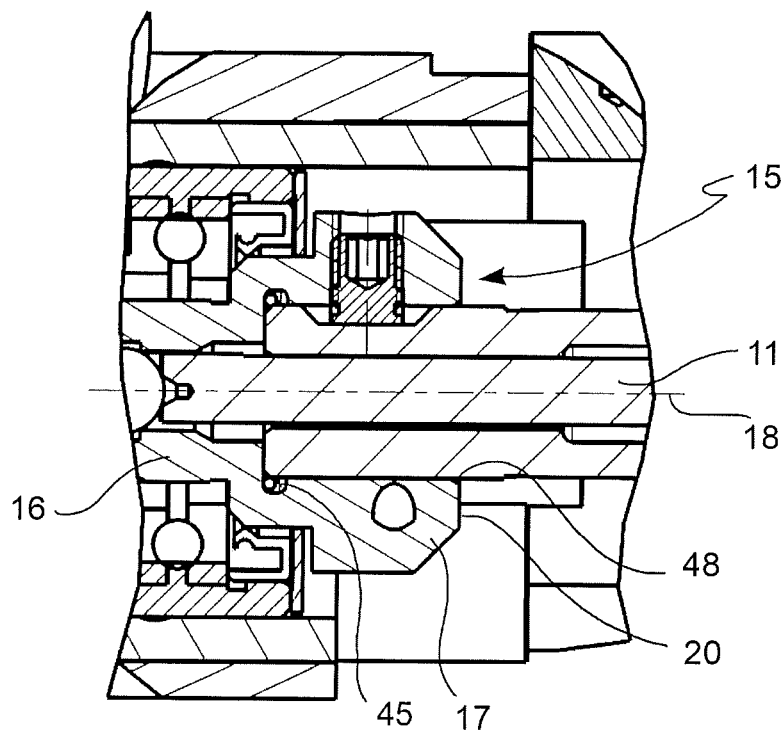
FIG. 6 is an enlarged section view of a coupling device of the drilling apparatus in FIG. 4, in a "Weldon" coupling mode.
Figure 7:
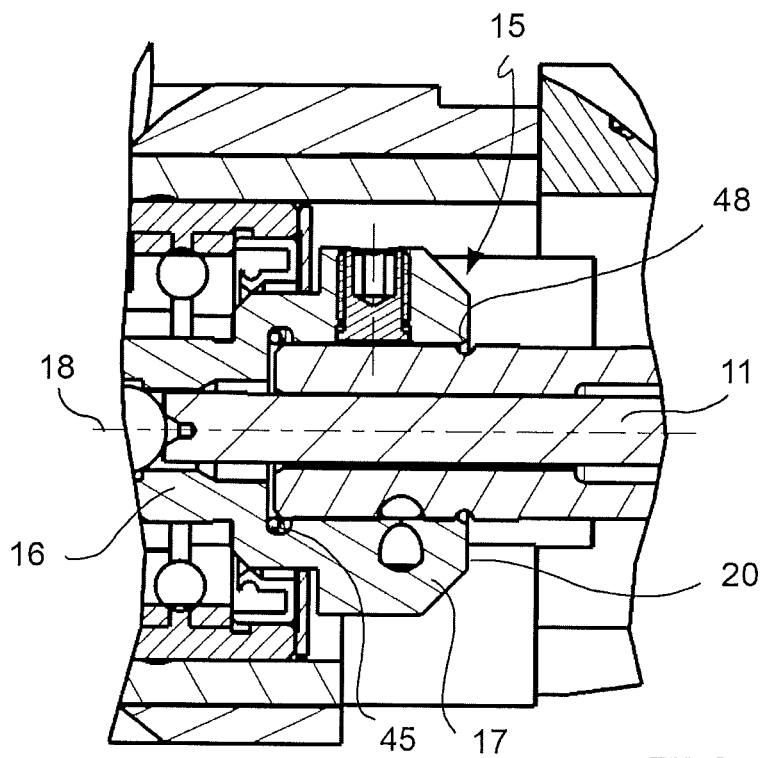
FIG. 7 is an enlarged section view of the coupling device of the drilling apparatus in FIG. 4, in a "Quick" coupling mode.
Figure 11:
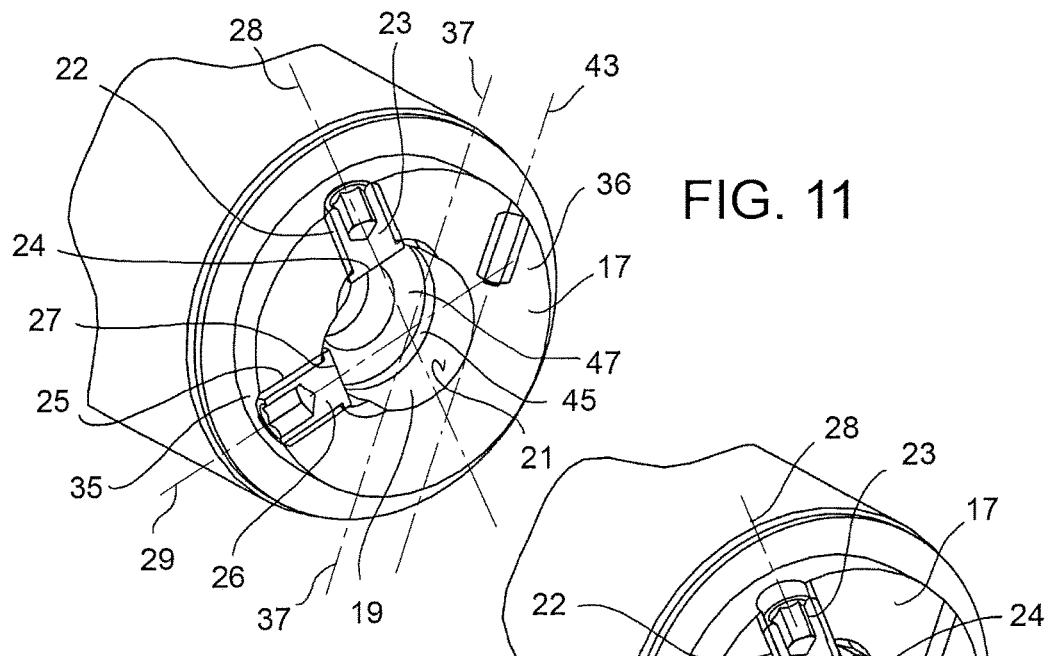
FIG. 11 is a perspective view in section according to a further section plane of the coupling device in FIG. 8.
Figure 12:
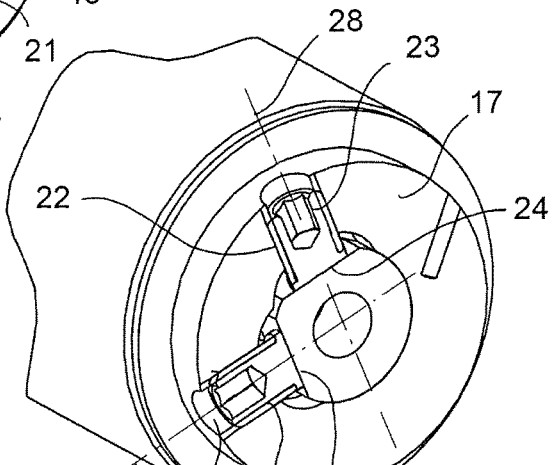
FIG. 12 is a perspective view in section of the coupling device in FIGS. 8 and 11 that receives a tool with "Weldon" coupling.
Figure 13:
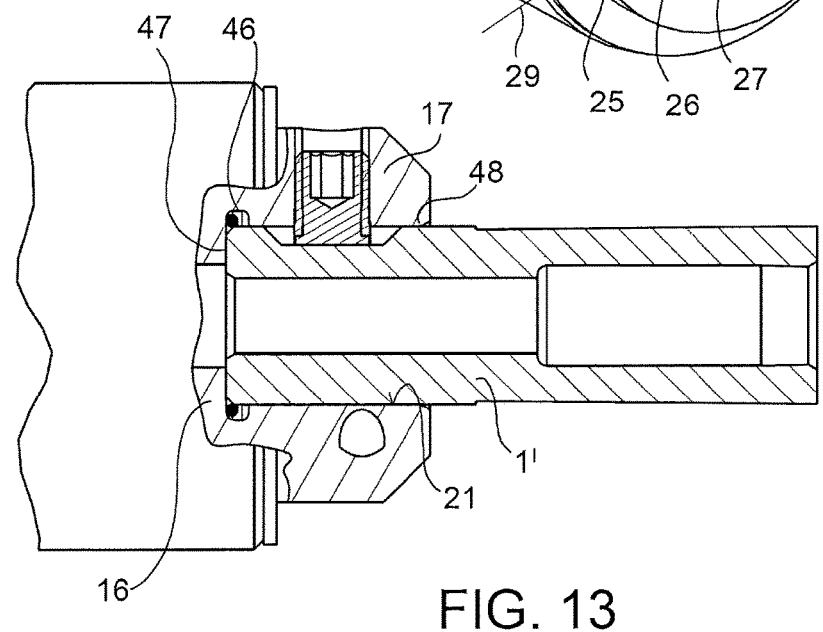
FIG. 13 is a side section view of the coupling device in FIGS. 8 and 11 that receives a tool with "Weldon" coupling.
Figure 14:
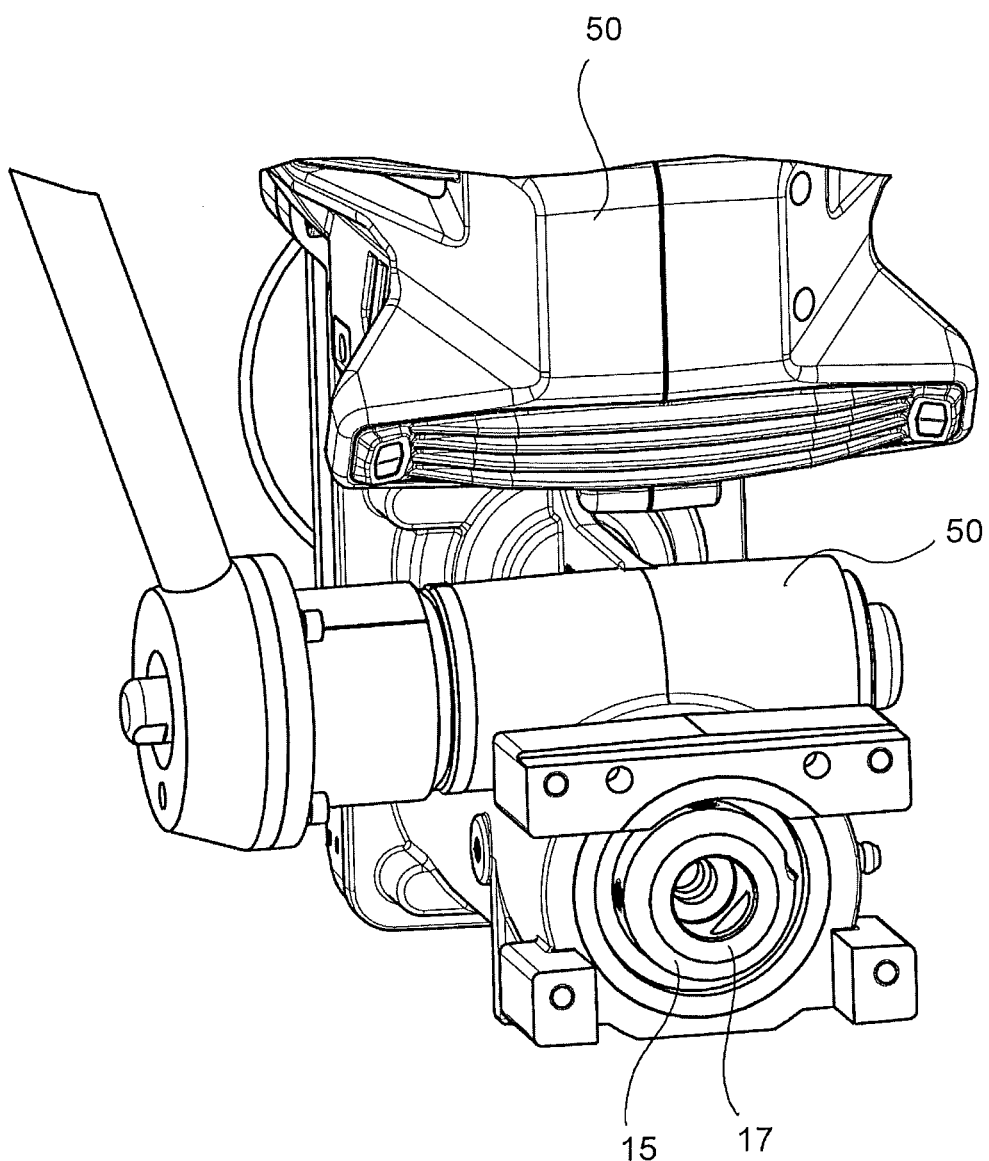
FIG. 14 is a perspective front view of a machine tool with the coupling device according to an embodiment.

With reference to the figures, a device 15 for coupling and centering tools 1, 1' with a spindle 16 comprises a tubular portion 17 having a longitudinal (geometric) axis 18 and forming:

a coupling seat 19 open at a front end 20 of the tubular portion 17 and laterally delimited by a cylindrical centering surface 21 coaxial to the longitudinal axis 18, a first threaded hole 22 wherein a first tightening dowel 23 is screwed, having a first tightening end 24 projecting into the coupling seat 19, a second threaded hole 25 wherein a second tightening dowel 26 is screwed, having a second tightening end 27 projecting into the coupling seat 19, wherein the first tightening dowel 23 and the second tightening dowel 26 extend along tightening axes 28, 29 transverse to each other and transverse with respect to the longitudinal axis 18, a third hole 30 substantially tangential to the centering surface 21 and which at least partially intersects the coupling seat 19.

A locking pin 34 is removably lockable in the third hole 30 in a position such as to interfere with the coupling seat 19, and removable from the third hole 30 such as to free the coupling seat 19.

The first threaded hole 22 with the first tightening dowel 23 and the second threaded hole 25 with the second tightening dowel 26 are arranged in a first half 35 of the tubular portion 17, whereas the third hole 30 is formed in a second half 36 of the tubular portion 17 geometrically separated from the first half by a diametrical plane 37 containing the longitudinal axis 9.

The coupling device 1 allows both "Weldon" and "Quick" tools to be received with the same modes of use already known by operators. The adaptation from one configuration to the other takes place easily through the insertion and extraction of the locking pin 34 into/from the third hole 30.

According to an embodiment, the third hole 30 has a first threaded portion 31, outside of the coupling seat 19, a second portion 32, preferably not threaded, outside of the coupling seat 19 and opposite the first portion 31, as well as a third portion 33 formed between the first and second portion 31, 32 and that intersects the coupling seat 19. The locking pin 34 comprises a threaded portion 38 able to be screwed into the first threaded portion 31 of the third hole 30, and an externally smooth portion 39 adapted to be received in the second portion 32 and third portion 33 of the third hole 30 and partially interfering with the coupling seat 19. Advantageously, the threaded portion 38 also forms a head/seat adapted to be engaged by a screwing tool, e.g. a hexagonal socket, a single slot or cross, and the first threaded portion 31 of the third hole 30 opens towards the outside of the tubular portion 17, thus forming the insertion and extraction side of the locking pin 34.

This improves the impermeability of the third hole 30 through the threaded engagement 31, 38 against undesired leaks of cooling liquid.

The third portion 33 of the third hole 30 is preferably a blind hole, open only in the coupling seat 19.

According to an embodiment, the locking ends 24, 27 of the first 23 and second 26 tightening dowels are widened with respect to the first 22 and second 25 threaded holes so as to prevent a full unscrewing (extraction) of the first 23 and second 26 tightening dowels towards the outside of the tubular portion 17.

This prevents the tightening dowels 24, 27 from being lost during use in "Quick" mode (with dowels 24, 27 not tight against the tool), despite the vibrations and cyclic movements of the device 15, and improves the impermeability of the first 22 and second 25 threaded holes against undesired leaks of cooling liquid.

According to an embodiment, the shape of the first 23 and second 26 tightening dowels is configured in such a way as to allow a full unscrewing thereof towards the inside of the coupling seat 19 and their removal and replacement through the coupling seat 19. This facilitates the initial mounting and the replacement of the tightening dowels without having to give up the prevention against loss of the tightening dowels during the use of tools 1' of the "Quick" type.

In the outlet area of each of the first 22 and second 25 threaded holes in the coupling seat 19 the tubular portion 17 forms a parking cavity 42 that is widened with respect to the threaded hole 22, 25, retracted with respect to the cylindrical centering surface 21 and sized so as to be able to receive the tightening end 24, 27 in a parked position not interfering with the coupling seat 19. This allows the device 15 to be used with tools 1' of the "Quick" type, and in particular the rotational tightening movement that would otherwise be impeded by the tightening dowels 23, 26.

Advantageously, the tightening ends 24, 27 each form a plate-like portion (with a flat front surface and) orthogonal to the radial direction to the longitudinal axis 18, thus providing a sure reference for a centering of the "Weldon" tool 1 with respect to the longitudinal axis 18.

At an end opposite to the tightening end 24, 27 and facing towards the outside of the tubular portion 17, the first 23 and second 26 tightening dowels form a head/seat, e.g. a hexagonal socket, a single slot or cross, accessible and engageable from outside of the device 15 by means of a screwing tool.

In an embodiment, the tightening axes 28, 29 (which coincide with corresponding central axes of the respective tightening dowels 23, 26 and threaded holes 22, 25) are orthogonal to one another and with respect to the longitudinal axis 18, and are contained in a common "Weldon" tightening plane orthogonal to the longitudinal axis 18.

In a further embodiment, a central axis 43 of the third hole 30 and/or of the locking pin 34 received in the third hole 30 (locking axis) is contained in a "Quick" locking plane orthogonal to the longitudinal axis 18 and spaced from the "Weldon" tightening plane in the direction of the front end 20 of the tubular portion 17.

In an embodiment, a central axis 43 of the third hole 30 and/or of the locking pin 34 received in the third hole 30 is parallel to the diametrical plane 37 and/or perpendicular to a radial symmetry plane 44 of the tubular portion 17. Moreover, the first and second threaded hole 22, 25 and the third hole 30 and, analogously, the tightening dowels and the locking pin, overlap in the longitudinal direction without interference or space violation. In other words, they are spaced from one another in a direction circumferential to the longitudinal axis 18, but at least partially overlapping in the longitudinal direction. Due to the circumferential distance, all of the holes are separated from one another with a single possibility of communication through the coupling seat 19.

This allows compacting the device 15 and a clear separation of the orifices and of their management for the purposes of safe conveying of the cooling liquid.

The device 15 also comprises an annular seal 45 arranged, for example, in an annular groove 46, at a rear end or bottom 47 of the coupling seat 19, and spaced from the third hole 30 and from the first 22 and second 25 threaded holes in the opposite direction to the front end 20 of the tubular portion 17.

The annular seal 45 works together with the sealing surface of the "Weldon" coupling portion 2 to prevent a loss of cooling liquid towards and through the third hole 30 that in "Weldon" mode has no locking pin 34.

The front end 20 of the tubular portion 17 also forms a flared front sealing surface 48 directly adjacent to the cylindrical centering surface 21.

The front sealing surface 48 works together with the annular seal 13 of the "Quick" coupling portion 2' to prevent a loss of cooling liquid towards and through the front opening of the coupling seat 19.

Finally, in order to further facilitate the use of the device 15 it comprises and forms a parking seat 49 spaced from the third hole 30, preferably outside and spaced from the tubular portion 17, and configured for receiving and retaining, for example through suitable threading, the locking pin 34 during use of the device 15 in "Weldon" mode.

The single components of the device 15, with the exception of the gaskets, can be made of metallic material, in particular steel, for example tool grade steel.

The device 1 can be connectable/connected or directly formed to a spindle 16, e.g. of a machine tool 50, for example of an apparatus for drilling rail tracks (FIGS. 4, 5).

The invention claimed is:

1. Device for coupling and centering tools, the device comprising a tubular portion having a longitudinal axis and forming:
   a coupling seat open at a front end of the tubular portion and laterally delimited by a cylindrical centering surface coaxial to the longitudinal axis,
   a first threaded hole wherein a first tightening dowel is screwed, having a first tightening end projecting into the coupling seat,
   a second threaded hole wherein a second tightening dowel is screwed, having a second tightening end projecting into the coupling seat, wherein the first tightening dowel and the second tightening dowel extend along tightening axes, transverse to each other and transverse to the longitudinal axis,
   a third hole substantially tangential to the centering surface and which at least partially intersects the coupling seat, and
   a locking pin removably lockable in the third hole in such a position as to interfere with the coupling seat, and removable from the third hole,
   wherein the first threaded hole with the first tightening dowel and the second threaded hole with the second tightening dowel are arranged in a first half of the tubular portion with respect to a diametrical plane containing the longitudinal axis, while the third hole is formed in a second half of the tubular portion with respect to the diametrical plane, and
   wherein the tightening axes are orthogonal to each other and radial to the longitudinal axis, and contained in a common tightening plane which is orthogonal to the longitudinal axis.

2. Device according to claim 1, wherein the third hole has a first threaded portion, external to the coupling seat, a second non-threaded portion, external to the coupling seat and opposite to the first portion, as well as a third portion formed between the first and the second portion and which intersects the coupling seat, wherein the locking pin comprises a threaded portion screwable in the first portion of the third hole, and an externally smooth portion adapted to be received in the second portion and third portion of the third hole and partially interfering with the coupling seat.

3. Device according to claim 1, wherein the tightening ends of the first and second tightening dowels are widened with respect to the first and second threaded holes so as to prevent a full unscrewing of the first and second tightening dowels towards the outside of the tubular portion.

4. Device according to claim 3, wherein the shape of the first and second tightening dowels is configured in such a way as to allow a full unscrewing thereof towards the inside of the coupling seat and a removal and replacement thereof through the coupling seat.

5. Device according to claim 3, wherein in an outlet area of each of the first and second threaded holes in the coupling seat, the tubular portion forms a parking cavity widened with respect to the threaded hole and retracted with respect to the cylindrical centering surface, and sized so as to receive the tightening end in a parking position not interfering with the coupling seat.

6. Device according to claim 1, wherein the tightening ends each form a plate-like portion orthogonal to the radial direction to the longitudinal axis.

7. Device according to claim 1, wherein a central axis of the locking pin received in the third hole is contained in a locking plane orthogonal to the longitudinal axis and spaced from the tightening plane in the direction of the front end of the tubular portion.

8. Device according to claim 1, wherein a central axis of the locking pin received in the third hole is substantially parallel to the diametrical plane and substantially perpendicular to a radial symmetry plane of the tubular portion.

9. Device according to claim 8, wherein the first and the second threaded hole and the third hole are spaced from one another in a direction circumferential to the longitudinal axis, but at least partially overlapped in the longitudinal direction.

10. Device according to claim 1, comprising an annular seal arranged at a rear end of the coupling seat, and spaced from the third hole and from the first and second threaded holes in a direction opposite to the front end of the tubular portion.

11. Device according to claim 1, wherein the front end of the tubular portion further forms a flared front sealing surface directly adjacent to the cylindrical centering surface.

12. Device according to claim 1, comprising a parking seat spaced from the third hole, in particular spaced from the tubular portion, and configured for receiving and retaining the locking pin when it is removed from the third hole.

13. Machine tool having a spindle to which a device according to claim 1 is connected.

\* \* \* \* \*